Patented June 19, 1945

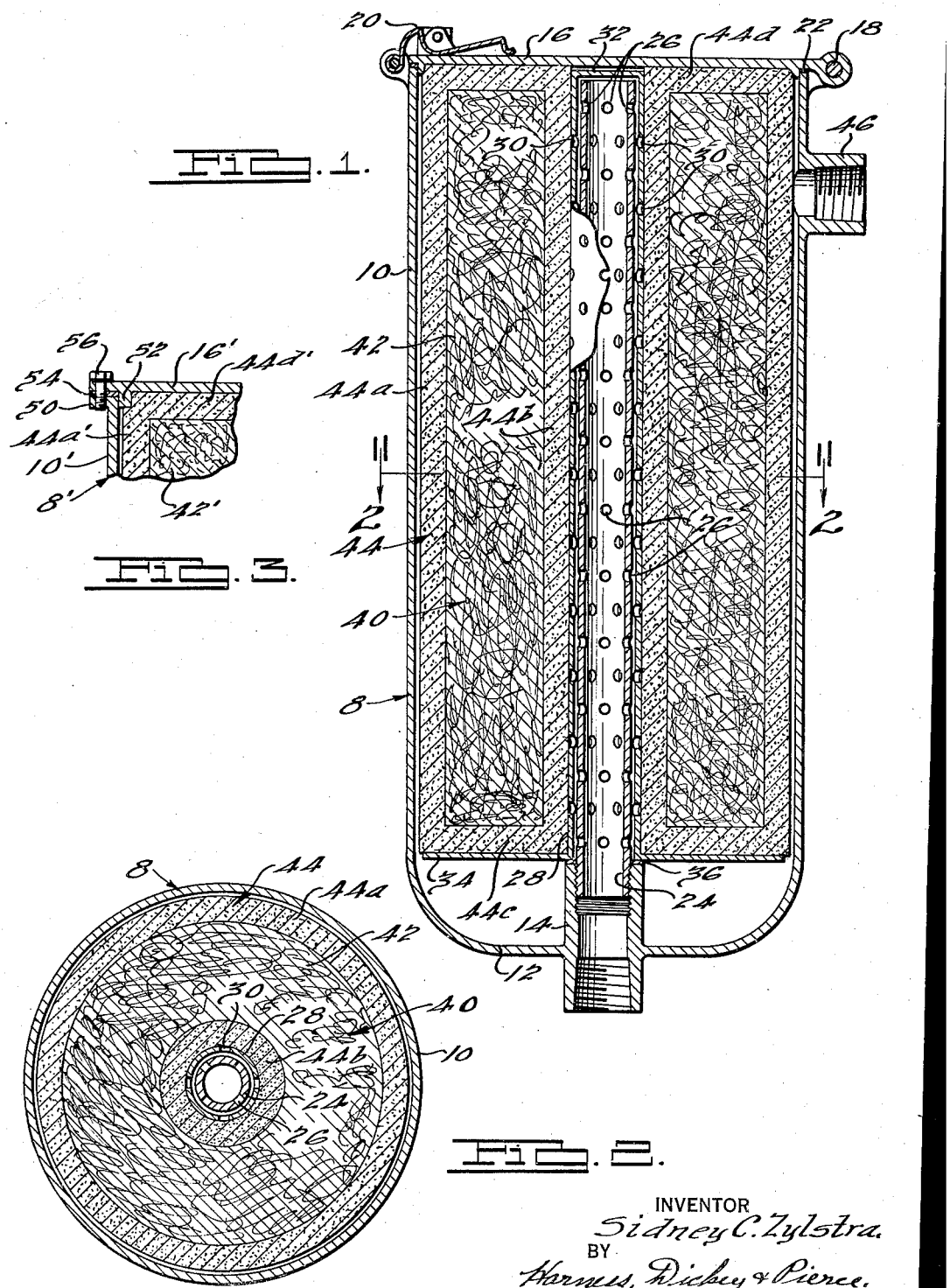

2,378,879

UNITED STATES PATENT OFFICE 2,378,879

FILTER STRUCTURE

Sidney C. Zylstra, Flint, Mich.

Application September 16, 1940, Serial No. 356,948

1 Claim. (Cl. 210—112)

This invention relates to filters employed for the purpose of removing foreign particles from liquids, the principal object being the provision of a filter having a filtering unit of improved characteristics.

Objects of the invention include the provision of a filtering element comprising a mass of filtering material such as hair, felt, jute, or other suitable fibrous material enclosed in a casing of readily deformable material which will permit the filtering element to be wrung out without permanently deforming the element; the provision of a filter including a removable and replaceable filtering element that may be immersed in the filtered or other liquid and then wrung out in order to clear the filter of foreign material and re-condition it for future use; the provision of a filter element comprising an annulus of suitable fibrous filtering material such as hair, felt, jute, or other suitable or fibrous material surrounded on all sides thereof by an annular casing of sponge-like material such as sponge rubber or cellulose sponge; and the provision of a construction as above described including an enclosing housing and a perforate tube extending into the interior of the filter and providing for a radial flow of the liquid being filtered between the radially inner and outer walls of the filtering element.

Other objects of the invention include the provisions of a filter comprising a casing having a removable cover and provided with a centrally disposed perforate tube fixed therein, a second perforate tube being loosely receivable over the first mentioned tube and having a radially outwardly extending flange at its lower end, together with a filtering element removably received upon the second tube and abutting the flange and being removable with the second tube and flange from the casing whereby to permit re-conditioning or replacement of the filter units on the tube; the provision of a construction as above described in which the filtering element is removably received upon the second tube; and the provision of a construction as above described in which the second tube is provided with a closed end portion as an aid to prevent short circuiting of liquid to the filter and providing a controlled flow of liquid therethrough.

The above being among the objects of the present invention the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a vertical sectional view taken axially through a filter of my improved design;

Fig. 2 is a transverse sectional view taken on the line 2—2 of Fig. 1; and,

Fig. 3 is a fragmentary view taken in the same plane as Fig. 1 and illustrating a filter identical to that shown in Fig. 1 except for a difference in cover construction and method of securing the cover in place.

The majority of depth type filters found on the market require replacement of the filtering element whenever it becomes sufficiently clogged to render its further use unsatisfactory. While such procedure may not be objectionable in some cases, as for instance in the oil filters of internal combustion engines where the filter may be used for a number of months before becoming sufficiently clogged to require replacement, there are many uses where the frequent replacement of the filtering unit would entail an unwarranted expense. Filters of the depth type have been proposed and built in which it is possible to remove the filtering element and remove the foreign material from them as by washing or the like so as to re-condition them for use, but as far as I am aware the constructions heretofore proposed have been such as to entail a considerable amount of time and labor in accomplishing this result and in most cases have been such that the shape of the filtering element is liable to be so distorted in such re-conditioning operation as to render it unsuitable for further use. The principal object of the present invention is to provide a filter and particularly a filtering element therefor that may be readily and quickly removed from its casing, the foreign material discharged from it in a quick and relatively easy manner and then replaced in its re-conditioned character, the filtering element being of such character as to hold its shape during the re-conditioning operation thereby permitting its replacement and re-use without adversely affecting its filtering ability.

The present invention, is, of course, applicable for use in filtering any liquid as long as its viscosity is not too high and as long as it is not of such character as to destroy the filtering material or its casing, but it will be recognized that the materials from which the filtering element and casing are constructed may be varied to a greater or lesser extent to better adapt them to withstand the action of a particular liquid to be filtered thereby. The particular filter illustrated has been designed primarily to filter the water in domestic washing machines, the wash water in such case being preferably continuously circulated through the filter so as to remove solid and semi-solid particles of foreign matter, lint, threads and the like. Because of the relatively great amount of foreign material to be removed from wash water under such conditions it is essential that the filtering element be capable of being readily removed and cleaned at relatively frequent intervals, usually not less than once during each wash period and sometimes more than once. Under such circumstances it is essential that the filtering element be easily removed and easily and quickly re-conditioned by washing the foreign material from it. The same general construction, however, may be employed for filtering other types of liquids.

Referring now to the accompanying drawing and particularly to Figs. 1 and 2 it will be noted that the filter there shown includes an exterior casing indicated generally at 8 and comprising a cylindrical hollow main body portion 10 having a closed bottom 12 provided with a central internally threaded boss 14 projecting both above and below the bottom wall 12. The top of the main body portion 10 is open and is provided with a cover 16 hinged thereto by means of a pin 18 and provided with a suitable quick operating catch mechanism indicated generally at 20 disposed diametrically opposite the pin 18. Preferably the cover 16 is provided with a suitable gasket 22 arranged to seal the joint between the lid 16 and the main body 10 when the lid is latched in closed position.

A tube 24 having a multitude of perforations 26 therein is positioned centrally of the casing 8 with its lower end fixed to the boss 14 as by being threaded therein as illustrated, the tube 24 being of a length to bring its upper end into adjacent but spaced relation with respect to the lower face of the cover 16 when the latter is in closed position. Loosely surrounding the tube 24 in generally spaced relation thereto is a second tube 28 also provided with a multitude of perforations 30 therein. The upper end of the tube 28 is closed by an end member 32, and fixed and sealed to its lower end is an annular outwardly directed flange 34 of an outer diameter slightly less than the inner diameter of the main body portion 10. The lower end of the tube 28 is adapted to rest upon and be supported by the upper end of the boss 14 and, if desired, a sealing gasket such as 36 may be provided around the tube 24 at this point.

Surrounding the tube 28 and resting upon the flange 34 and extending radially outwardly from the tube 28 to a point adjacent to, but spaced from, the inner walls of the main body portion 10, is a filtering element indicated generally at 40. It is of an axial length such that when the cover 16 is closed it is axially compressed between the cover and the flange 34, thereby preventing possibility of the liquid flow short circuiting between the upper end of the element 40 and the cover 16, between the lower end of the element 40 and the flange 34, and serving to press the lower end of the tube 28 firmly down on the upper end of the boss 14, or upon the gasket 36 when interposed therebetween, and thus preventing short circuiting of the flow of liquid at this point.

The filtering element 40 comprises an annular centrally disposed main body portion or core 42 of suitable filtering material preferably of a fibrous nature such as hair, felt, jute, or other suitable or similar material either alone or a suitable combination of such materials, and a hollow annular enclosing casing indicated generally at 44 and comprising a radially outer wall 44a, a radially inner wall 44b, and opposite end walls 44c and 44d all of which are suitably secured together. While in the broader aspects of the present invention the casing 44 may be made from fabric or other suitable liquid pervious material that is capable of being readily deformed without taking a permanent set, and yet of a character to hold the core in shape, such as suitable fabrics or the like, it is preferably formed of sponge-like material and may be formed from either sponge rubber of the same general character as is found in bath sponges made from sponge rubber and, of course, capable of allowing liquid to pass therethrough, or it may be of cellulose sponge or equivalent sponge-like material which, in any event, is of more or less resilient character permitting it to be squeezed to wring it out and which will thereafter resume its original shape when the pressure is relieved. Where the casing 44 is formed of such sponge-like material it is preferably of a material wall thickness as shown and preferably about 25% of the thickness of the core 42 or about 16% of the total wall thickness of the filter element 40, but this thickness may, of course, vary between greater and lesser percentages than those given and is principally relied upon to maintain the shape of the filter element 40 so as to permit it to be cleaned and readily replaced. The pores or interstices of the casing 44 are preferably of such size as to allow the smaller particles of foreign material to pass therethrough and be caught by the finer, more compact layer of material 42 therein, but the larger of such particles, and in the case of wash water particularly the lint, will be caught by the radially outer surface or surface portion of the layer 44 and be retained thereby.

Although the casing 44 may be made from sheet stock and suitably secured together about the inner layer 42, particularly where it is made from a moldable material such as either sponge rubber or cellulose sponge it may be molded with the inner, outer and bottom walls 44b, 44a, and 44c, respectively, integral, permitting the layer or core 42 to be inserted through the open top thereof and thereafter the top wall 44d may be suitably secured and preferably sealed in place to the side walls 44a and 44b to complete the assembly.

In operation the flow of liquid through the filtering element 40 is, of course, radial and may be either radially outward or radially inward. For this purpose the main body portion 10 is provided with a hollow boss or connection 46, preferably adjacent the upper end thereof, and internally threaded to receive a pipe or the like. Thus the liquid may be introduced either through the connection 46 or through the lower end of the boss 14 depending upon the direction of flow desired in which case the boss 14 or connection 46, respectively, will be connected to a suitable point of discharge. Preferably the liquid is introduced into the connection 46 from which it flows around the filter element 40 to fill the space between the periphery of the filter element 40 and the inner wall of the main body portion 10, then works its way radially inwardly through the filtering element 40 and through the tubes 28 and 24 to the interior of the tube 24 and then downwardly and out through the boss 14.

It will be appreciated that with the construction shown, in order to clean the filtering element 40 all that is necessary is to release the catch 20, swing the lid 16 out of position, and lift the filtering element 40 together with the outer tube 28 and flange 34 from the main body portion 10. When this is done then liquid under pressure may be introduced into the lower end of the tube 28 to cause a reverse flow of liquid through the filtering element 40 or, and as will usually be found more convenient, quicker and more satisfactory generally, the filtering element may simply be wrung out either while it is on the tube 28 or after it has been removed therefrom. In other words, the filtering element 40 may be wrung out, then again immersed in the cleaning liquid and the wringing out operation repeated, and such operations repeated a sufficient number of times to insure all of the foreign material being discharged from the filtering element. Where the material being filtered is water the element may simply be placed under an open tap and repeatedly wrung until the foreign material has been completely discharged from the filter. After the filter has been cleaned as described or otherwise, it is replaced upon the tube 28, in case it has been removed therefrom for cleaning, and pressed down firmly against the flange 34, and then the assembly of the tube 28, flange 34 and filter element 40 may be re-inserted into the casing 8, the cover 16 closed and latched in place with the latch 20, upon which the filter is again in condition for use.

As previously mentioned the material from which the core 42 and casing 44 of the filtering element 40 is formed will depend upon the character of the material which is being filtered. For instance, where water is being filtered almost any suitable material may be employed. Where oil or other hydrocarbons are being filtered it will, of course, be impossible to employ ordinary types of sponge rubber for the casing 44 of the filtering element 40 and in such case if of sponge-like character it may be made of sponge material made from any suitable synthetic rubbers capable of resisting the action of hydrocarbons, or may be made from cellulose sponge. It will also be appreciated that the character of the core 42 may vary according not only to the liquid which is being filtered, but also to better conform to the particular type of impurities which are desired to be removed during the filtering process, the finer the foreign material the finer the character of the core 42 as will be readily appreciated.

The particular construction of the cover 16 and method of securing it in place illustrated in Figs. 1 and 3, while suitable for use in connection with a domestic washing machine and the liquid pressures which will ordinarily be encountered therein, might not be satisfactory where different liquids or liquids under higher pressures are to be filtered and it will, of course, be appreciated that any suitable type of cover and any suitable method of securing it in place may be employed without affecting the present invention. One alternate method of securing the cover in place where liquids under higher pressures are being filtered is illustrated in Fig. 3 in which case the main body portion is indicated at 10' and the cover at 16'. In this case the main body portion 10' is provided with a radially outwardly directed marginal flange 50 at its open end and the cover 16' which is provided with a substantial piloting ring 52 adapted to be guided interiorly of the main body portion 10 and overlies the flange 50 outwardly thereof. A suitable gasket 54 is interposed between the upper face of the flange 50 and the cooperating surface of the cover 16' and suitable bolts or screws 56 are passed downwardly through the margins of the cover 16' and threaded into the flange 50, thereby to clamp the cover 16' in place and to compress the gasket 54 to provide the desired seal.

Formal changes may be made in the specific embodiment of the invention described without departing from the spirit or substance of the broad invention as defined in the appended claim.

What is claimed is:

A filtering element comprising a hollow annulus of liquid permeable cellulose sponge of material wall thickness, and a mass of material of fibrous characteristics completely filling the hollow interior of said annulus.

SIDNEY C. ZYLSTRA.